(12) United States Patent
Reyes et al.

(10) Patent No.: US 9,796,435 B1
(45) Date of Patent: Oct. 24, 2017

(54) RETRACTABLE ASSEMBLY COMPRISING A PLATFORM

(71) Applicant: Crazy Turtle Robotic Platforms, LLC., Sunny Isles Beach, FL (US)

(72) Inventors: Daniel Reyes, Sunny Isles Beach, FL (US); Renato Gross, Auburn, AL (US)

(73) Assignee: Crazy Turtle Robotic Platforms, LLC., Sunny Isles Beach, FL (US)

( * ) Notice: Subject to any disclaimer, the term of this patent is extended or adjusted under 35 U.S.C. 154(b) by 0 days.

(21) Appl. No.: 15/236,068

(22) Filed: Aug. 12, 2016

(51) Int. Cl.
| | |
|---|---|
| *B62D 55/06* | (2006.01) |
| *B66F 9/06* | (2006.01) |
| *G05D 1/00* | (2006.01) |
| *G05D 1/02* | (2006.01) |
| *B62D 33/023* | (2006.01) |
| *B62D 33/02* | (2006.01) |
| *B66F 9/075* | (2006.01) |

(52) U.S. Cl.
CPC ............. *B62D 55/06* (2013.01); *B62D 33/02* (2013.01); *B62D 33/023* (2013.01); *B66F 9/06* (2013.01); *B66F 9/07581* (2013.01); *G05D 1/0011* (2013.01); *G05D 1/0276* (2013.01)

(58) Field of Classification Search
CPC ....... B62D 55/06; B62D 55/065; B62D 55/00
See application file for complete search history.

(56) References Cited

U.S. PATENT DOCUMENTS

| | | | |
|---|---|---|---|
| 8,413,752 B2 * | 4/2013 | Page | B25J 5/005 180/68.5 |
| 9,656,704 B2 * | 5/2017 | Couture | B25J 5/005 |

\* cited by examiner

*Primary Examiner* — John Walters
*Assistant Examiner* — James Triggs
(74) *Attorney, Agent, or Firm* — Sanchelima & Associates, P.A.; Christian Sanchelima; Jesus Sanchelima

(57) ABSTRACT

The present disclosure discloses an apparatus that can be retracted for efficient storage and can be used for transporting materials from one location to another. The apparatus includes a retractable assembly coupled to track members that are expanded and retracted using the retractable assembly. The retractable assembly uses a plurality of arms connected to a slide member that have slide attachment members that move along the slide to retract and expand the present invention. The apparatus can be configured to cooperate with a forklift assembly, a storage box member or platforms to transport materials and loads. The apparatus can be two or four wheel drive and can be configured with more wheel members depending on the desired use.

14 Claims, 8 Drawing Sheets

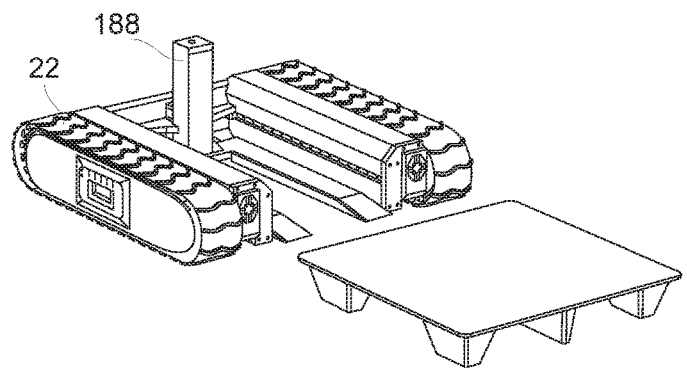
FIG. 2
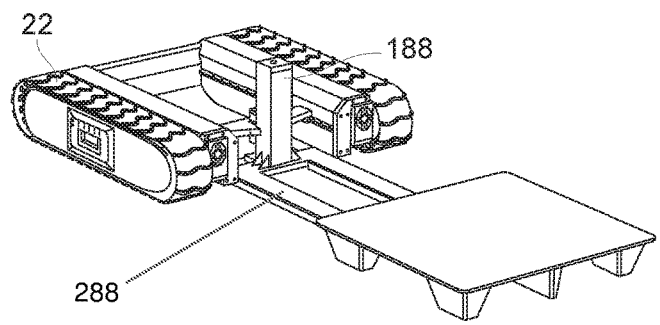
FIG. 3
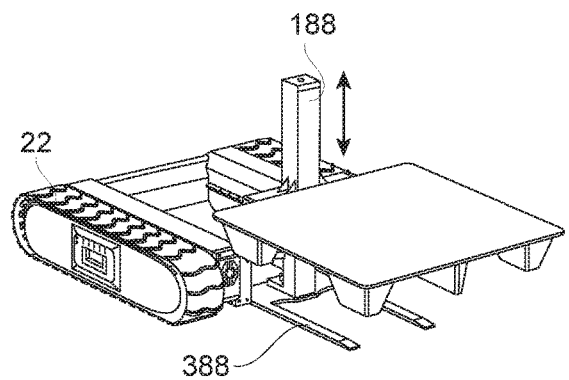 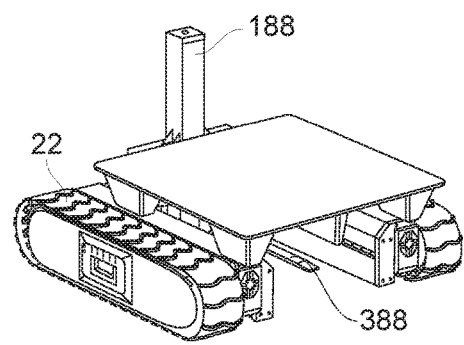
FIG. 4　　　　　　　　FIG. 5

United States Patent 9,796,435 B1

RETRACTABLE ASSEMBLY COMPRISING A PLATFORM

FIELD OF INVENTION

The present disclosure relates to a field of transporting and storing materials. More specifically, the present disclosure relates to a retractable assembly comprising a platform and driving means, to transport and store materials.

BACKGROUND

As known, robots are used to transport or stack loads or materials in a manufacturing facility, storage units, and so on. Generally, wheeled robots, tracked robots or legged robots are used to transport or stack the materials. The type of robot to be used is selected based on the location such as warehouse, road, terrain and so on. Further, the robots may be used to carry materials from one location to another. For example, a tracked robot may be used to transport materials in a warehouse from one location to another. The tracked robot may comprise a platform to carry the materials during the transportation.

Generally, the robots with the platform used for carrying the load are made out of metal. As a consequence, the robots are heavy and bulky. Further, the robots comprise a battery that is insufficient to power the robot for a long time. In addition, the robots functionality becomes limited due to lack of required modules or accessories for multiple uses in the various industries such as logistics, naval, aerospace, defense, automotive, construction and other industries where the materials need to be transported from point of storage to point of use or shipment.

SUMMARY

The above-mentioned problems are addressed by providing a retractable comprising a platform and driving means.

In one aspect of the present disclosure, a retractable assembly for transporting materials from one location to another is disclosed. The retractable assembly comprises tracks coupled to a frame member. The retractable assembly further comprises a platform placed on the frame member. The retractable assembly further comprises platform members that are retractable and are coupled to the frame member. The platform members are adjusted or folded to manage the distance between the tracks. The platform is used to carry loads or material and the platform may be stacked with other platforms. The retractable assembly further comprises a driving means in the tracks. The tracks move forward thereby transporting the load on the platform from one location to another.

In another aspect of the present disclosure, the platform member comprises a boat hitch for retraction.

In yet another aspect of the present disclosure, the retractable assembly is used for self-loading of the materials. In the present aspect, the retractable assembly comprises a fixed bracket and a movable bracket placed in parallel. The movable bracket comprises a rack with a fork. The fork is used to carry the load or pallet. The rack is lifted to carry the load and place on the frame member.

The features and advantages described in this summary and in the following detailed description are not all-inclusive, and particularly, many additional features and advantages will be apparent to one of ordinary skill in the relevant art, in view of the drawings, and specification thereof. Moreover, it should be noted that the language used in the specification has been principally selected for readability and instructional purposes, and may not have been selected to delineate or circumscribe the inventive subject matter.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2-5 illustrate operation of the fork lift assembly 80, in accordance with one embodiment of the present disclosure.

DETAILED DESCRIPTION

In the present disclosure, relational terms such as first and second, and the like, may be used to distinguish one entity from the other, without necessarily implying any actual relationship or order between such entities. The following detailed description is intended to provide example implementations to one of ordinary skill in the art, and is not intended to limit the invention to the explicit disclosure, as one or ordinary skill in the art will understand that variations can be substituted that are within the scope of the invention as described.

The present discloses a retractable assembly comprising tracks coupled by a frame member. The retractable assembly comprises a platform placed on the frame member. The retractable assembly further comprises platform members that are retractable and are coupled to the frame member. The platform members are adjusted or folded to manage the distance between the tracks such that the retractable assembly can be maneuvered in narrow locations or terrains.

The platform is used to carry loads or material and the platform may be stacked with other platforms. The track further comprises a driving means to drive the tracks in forward direction. In one embodiment, the platform member is replaced with a boat hitch. In another embodiment, the platform member is replaced with a rack comprising a fork-like structure. The various embodiments of a retractable assembly are explained in conjunction with the description of the figures.

Figure 1:
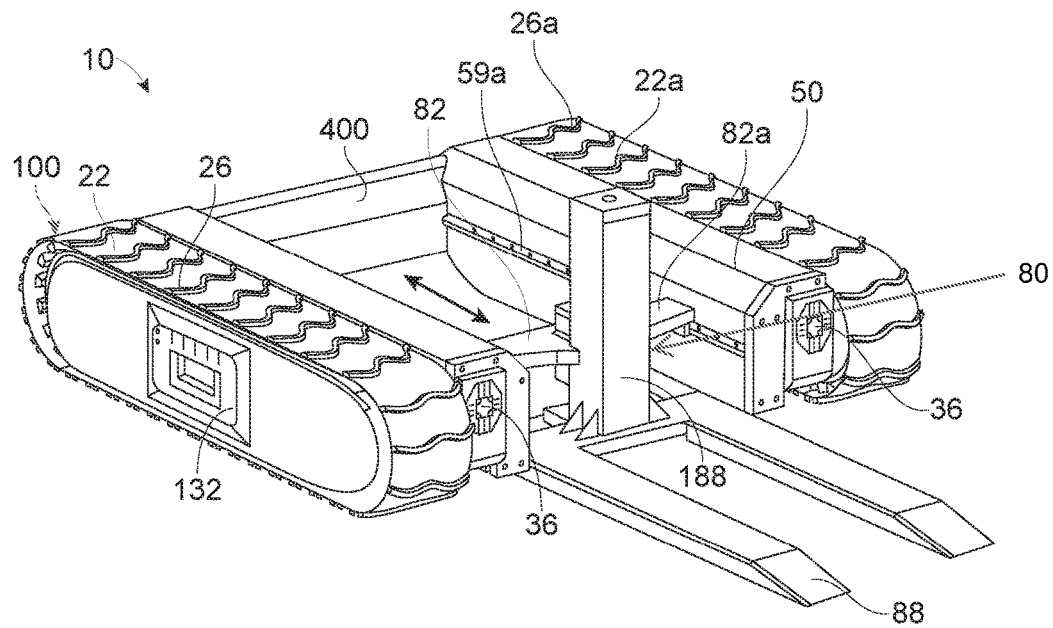
FIG. 1 illustrates the present invention, in accordance with one embodiment of the present disclosure implementing one of its uses, namely, fork lift assembly 80 attached thereon.
Figure 1A:
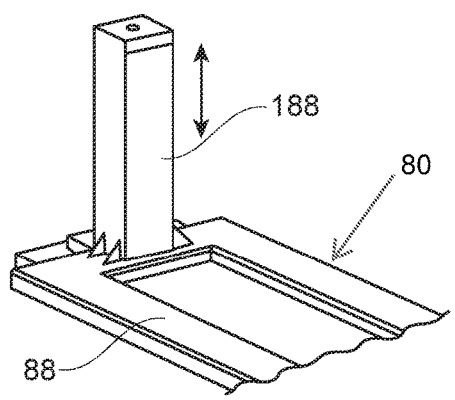
FIG. 1A illustrates a partial, enlarged view of fork lift assembly 80 showing fork lift member 88 and vertical beam 188 perpendicularly attached thereon.
Figure 1B:
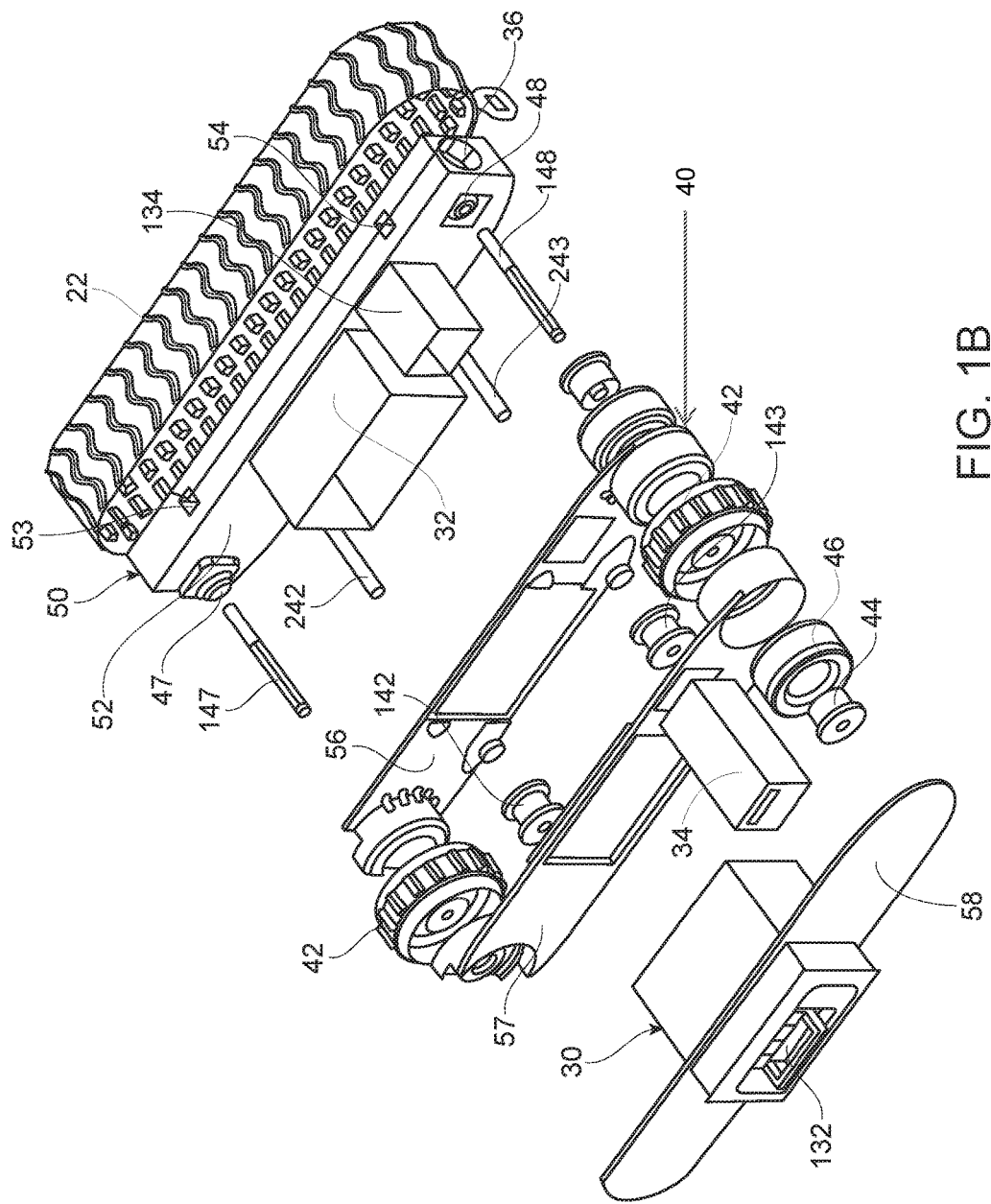
FIG. 1B illustrates an exploded view of a track assembly of the retractable assembly, in accordance with one embodiment of the present disclosure.

Referring to FIGS. 1 and 1B, a retractable assembly 10 for transporting materials is shown, in accordance with one embodiment of the present disclosure. The retractable assembly 10 comprises a track assembly 20. The track assembly 20 comprises tracks (22, 22a) placed spaced apart and in parallel with respect to each other and each having a front and rear distal end. The track assembly 20 further comprises track gears (24, 24a) at front and rear distal ends, respectively, of the tracks (22, 22a), as shown in FIG. 1. The tracks (22, 22a) further comprise ridges (26, 26a), respectively to provide grip between tracks (22, 22a) and a surface.

As shown in FIG. 1B, control unit assembly 30 includes battery box 32 located about halfway along the inner portion of track member 22. Battery box 32 includes a removable battery 132. Control unit assembly 30 includes control box 34 which slides into control box housing 134 to protect control box 34 from external elements such as water. Control box 34 is housed within control box housing 134 and controls the motors by receiving the remote signals to control the speed of the gears, whether the present invention goes straight, turns, its speed, and controls the battery, light sensors and similar components. Control unit assembly 30 can further include a plurality of sensor/light units 36. One light is used to indicate forward movement and a second light is used to designate backwards movement. Each track member 22; 22a has a similar control unit assembly 30 to control its respective battery and motors.

As seen in FIG. 1B, wheel assembly 40 within track assembly 20 includes wheels 42. Wheel assembly 40 includes ball bearings 47;48. Axles 147; 148 are mounted to chassis assembly 50 and are inserted through wheel assembly 40. In one embodiment, each track may only have one motor powering each wheel 42 to move the tracks forward and back. In another embodiment, the other wheel on track member 22 or 22a may act only as a follower. The device can be configured to be two-wheel or four-wheel drive.

Optionally, support wheels 142; 143 can be connected to support axles 242; 243 which extend into chassis assembly 50 that is located between wheels 42 to better maneuver sharp corners and difficult terrains. Wheel assembly 40 includes starter 44 that induces current to turn rotor 46 and then wheel 42. The combination of the stator 44 and the rotor 46 are known in combination as the motor. Optionally, each wheel 42 can be powered by a motor. Additional motors can be used in each wheel 42 or additional wheels 42 can be included to cooperate with larger embodiments.

The track assembly 20 is connected to chassis assembly 50 that includes chassis member 52 that includes openings 53; 54 where platform is mounted into using pegs. Chassis assembly 50 further includes enclosing panels 56; 57; 58 that help hold the components of wheel assembly 40 to each other and to chassis assembly 50.

Referring to FIGS. 1-5, fork lift assembly 80 is shown, in accordance with one embodiment of the present disclosure. Fork lift assembly 80 includes attachment members 82; 82a that is mounted to chassis assembly 50. Track member 59a that extends longitudinally along it. Fork lift assembly 80 moves along the track, similar to how drawers function. Fork lift assembly 80 also includes fork lift member 88 that is connected to vertical beam 188, that is in turn connected to attachment members 82; 82a.

Fork lift member 88 includes vertical beam 188 that is rigidly mounted thereto. Fork lift member 88 includes upper fork member (not shown) and lower fork member 388, as seen in FIG. 4. In FIG. 1, upper fork member is flush against lower form member 388. Lower fork member 388 is located below vertical beam 188 and is rigidly mounted thereto.

When attachment members 82; 82a are slid to the front of track 59a, the fork members 88 then clear track assembly 20 allowing them to pick up predetermined objects. Vertical beam 188 houses a hydraulic unit that is connected to control unit assembly 30 and the battery 132 to power the telescopic movement of fork lift member 88. Upon the corresponding data instructions being sent, vertical beam 188 rises using the hydraulic unit bringing upper fork member 288 along with it while attachment members 82; 82a are still in track 59a. Lower fork member 388 remains fixed to the base of vertical beam 188 to provide support to fork lift assembly 80. Lower fork member 288 is actuated by a hydraulic cylinder and has the task to lower to the ground providing support for the upper fork member 388 while it lifts the pallet carrying the goods.

Fork lift member 88 can be moved forwards or backwards along track 59a and can be raised or lowered depending on the task being undertaken. In one embodiment, a motor can be added that moves attachment members 82; 82a forwards and backwards along track 59a. In an alternate embodiment, track assembly 20 moves forward and backwards and fork lift assembly remains stationary is allowed to clear track assembly 20 due to the displaced location of the track assembly 20 and the chassis assembly 50. As seen in FIG. 1, connecting beam 400 is shown to keep track members 22; 22a aligned and together.

The retractable assembly may be configured for repeated loading or unloading operations in a manufacturing facility. Further, the retractable assembly may be used in narrow locations or cross challenging terrains by adjusting the platform members. Further, the retractable assembly may be used for easy storing and staking the materials in an industrial or commercial facility. Further, the platform may be configured for carrying different sizes of the pallets.

Figure 6:
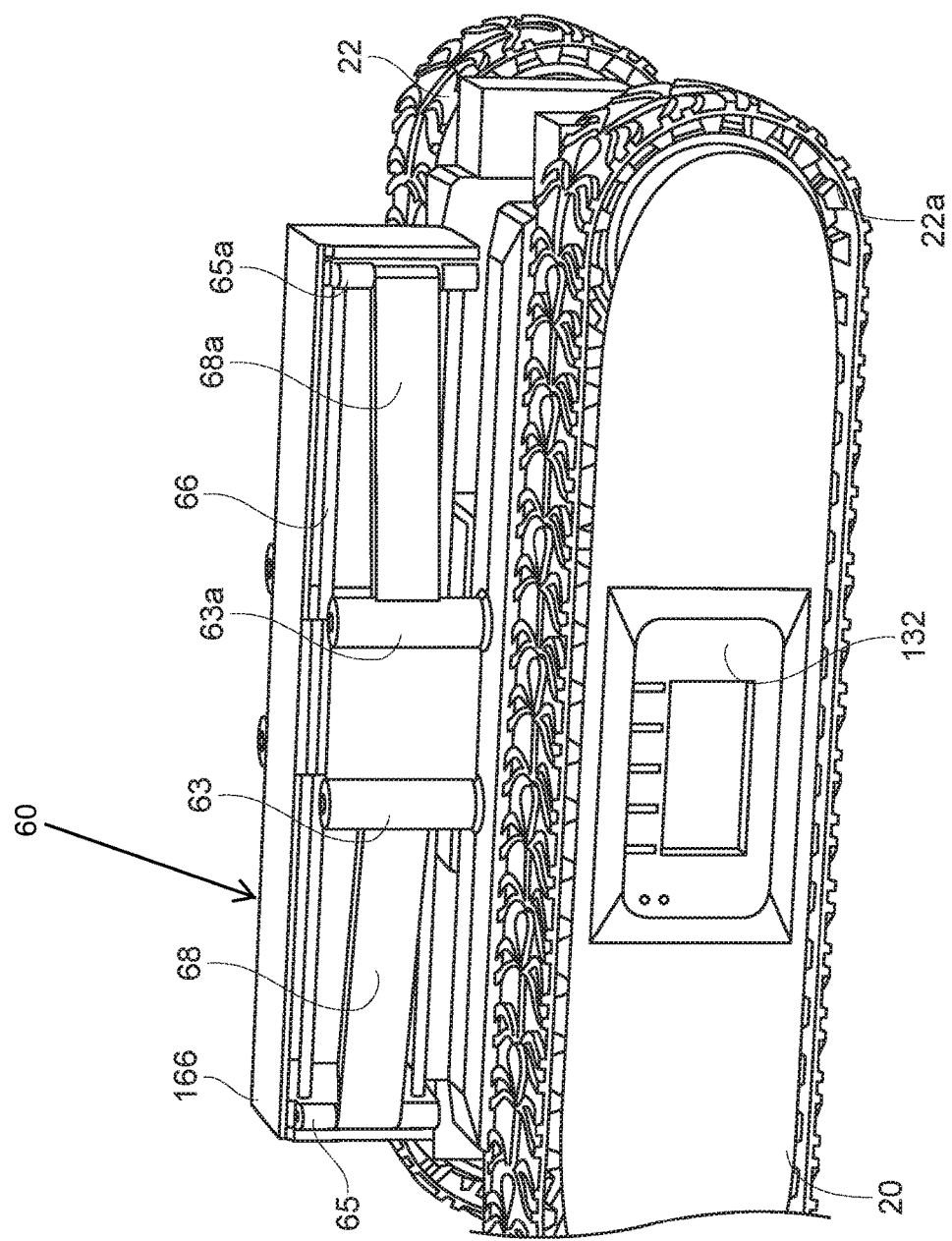
FIG. 6 illustrates retraction assembly 60 in the retracted position.
Figure 7:
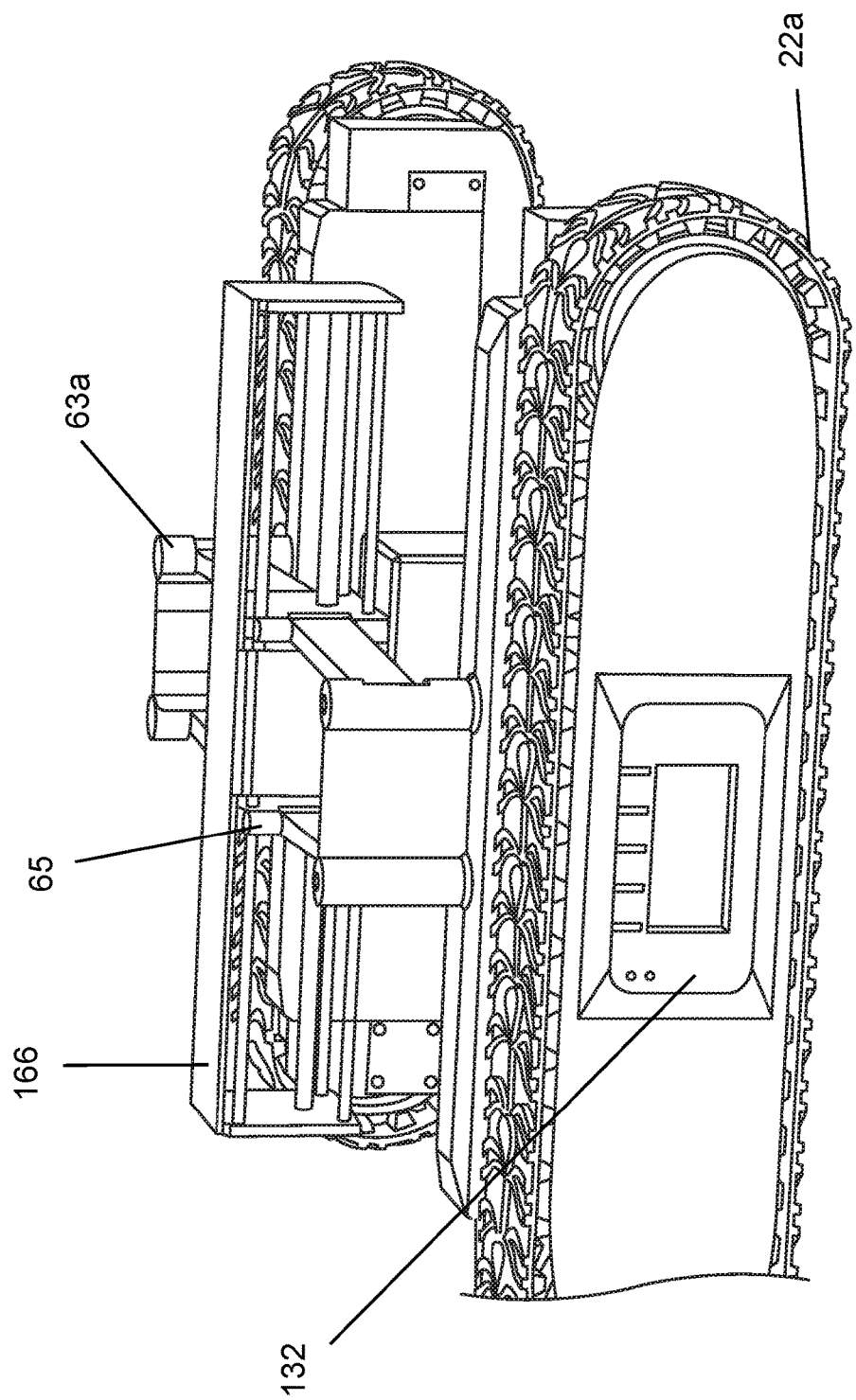
FIG. 7 illustrates retraction assembly 60 in the expanded position showing track members 22; 22a pushed away from each other.

As shown in FIGS. 6 and 7, the retraction assembly 60 is mounted to chassis assembly 50 using motorized retractable members 63; 63a. Slide attachment members 65; 65a are used to connect arms 68; 68a to slide member 66. In its retracted position arms 68 are positioned in the distalmost opposite ends of slide member 66. When the present invention is to be expanded thereby having track members 22 expanded away from each other as shown in FIG. 7, slide attachment members 65; 65a are slid along slide member 66 towards each other pushing arms 68; 68a outwards away from slide member 66 until arms 68; 68a are substantially parallel to each other. Slide member 66 is partially housed within slide housing 166. Each track member 22; 22a has a symmetrical retraction assembly 60 as the one described above and as shown in the drawings. The actuation of slide attachment members 65; 65a can be done manually or using motorized means housed within motorized retractable members 63; 63a and connected control unit assembly 30. Data instructions can be sent remotely through wireless means to actuate the retraction of the present invention. This retraction feature allows the present invention to be stored and transported efficiently and and at the same time provides a simple way to implement the functions of the present invention.

Figure 8:
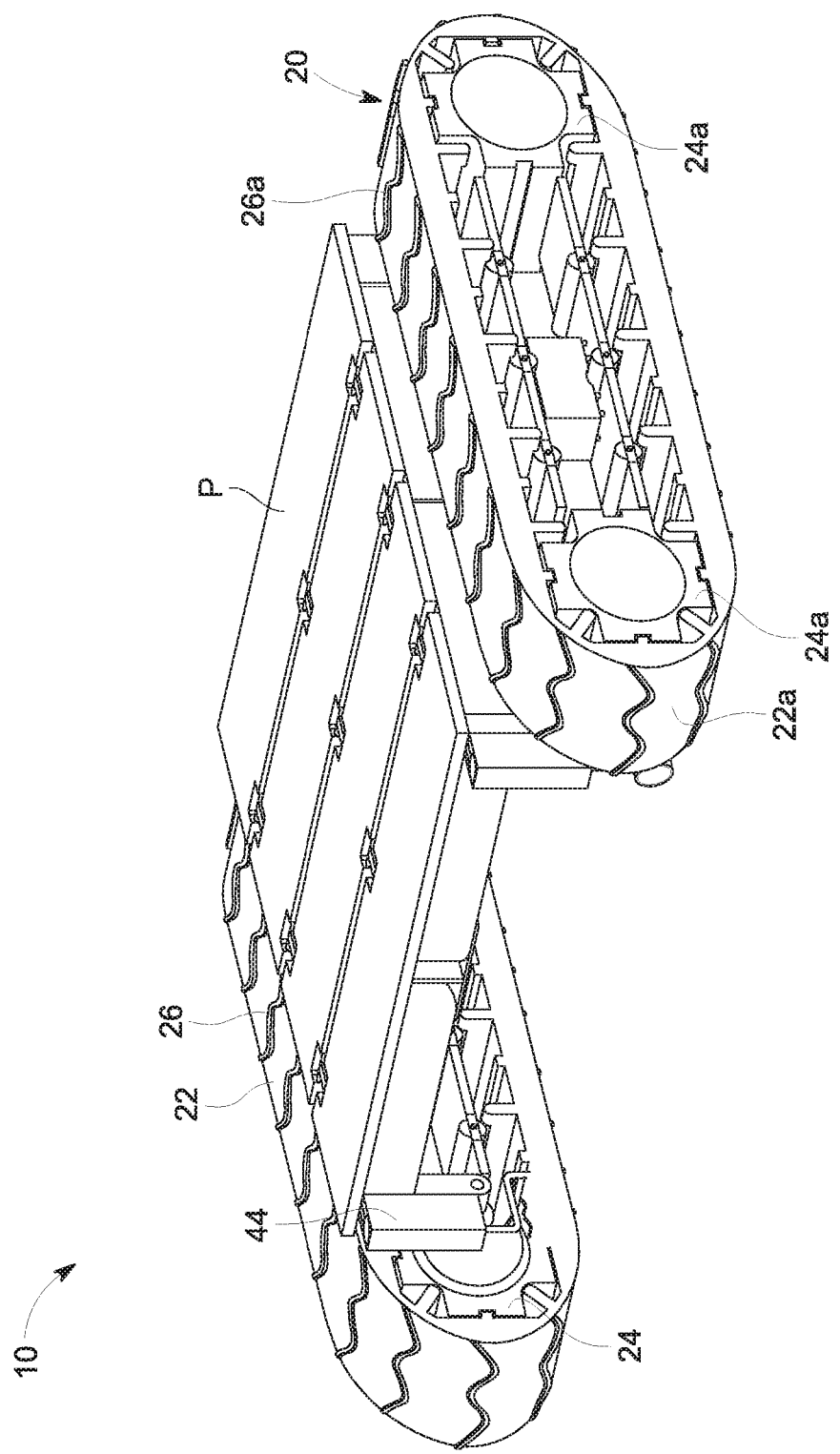
FIG. 8 shows an embodiment of the present invention wherein platform P is mounted using pegs or similar means into mounting openings in chassis assembly 50.
Figure 9:
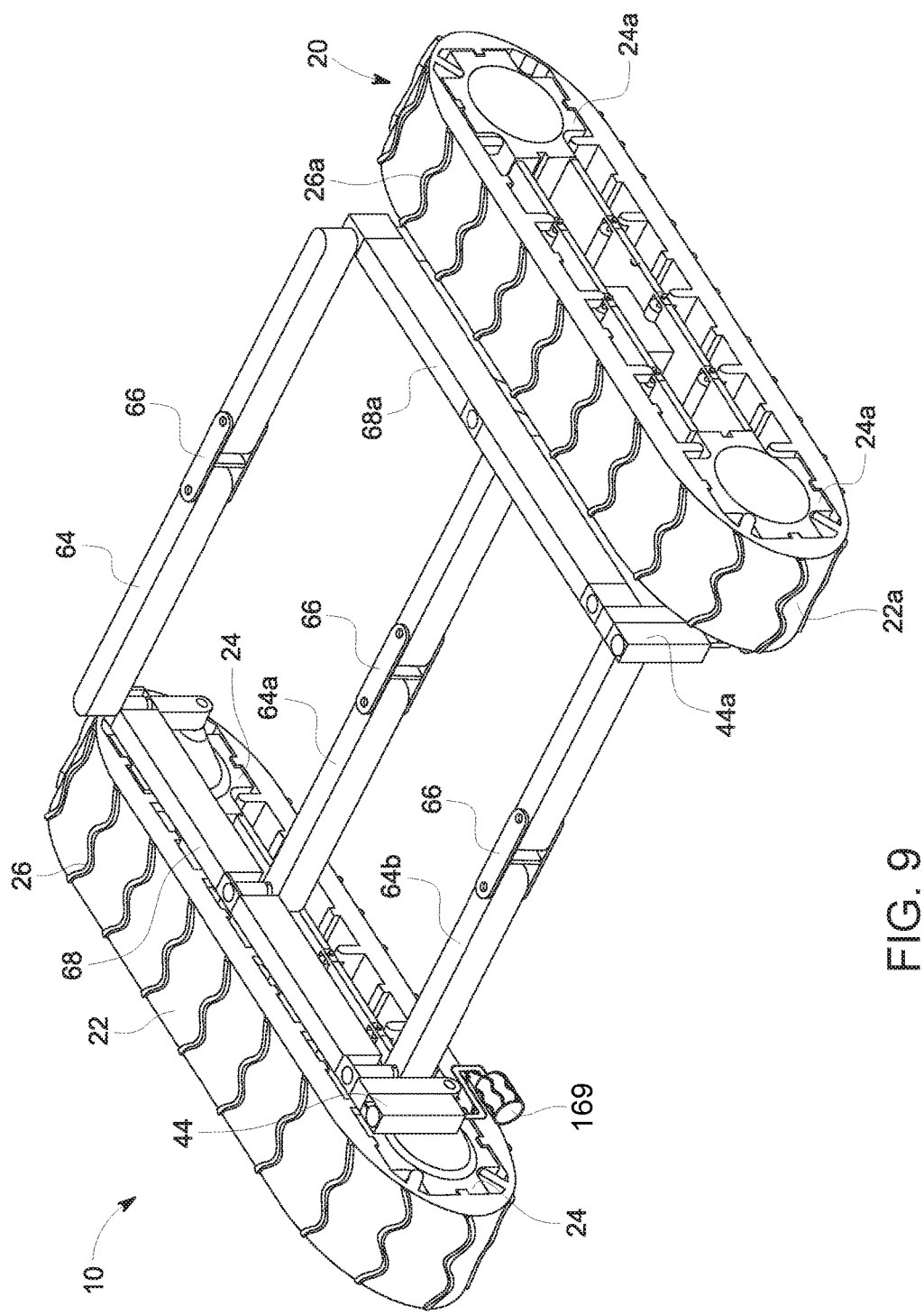
FIG. 9 is an alternate embodiment of the retraction assembly 60 of the present invention.

In an alternate embodiment shown in FIGS. 8-9, retraction assembly 160 can include a plurality of platform members 164; 164a; 164b perpendicularly mounted to track members 22; 22a. These platform members 164; 164a; 164b can work with hinges 166 to expand or retract the present invention. The alternate embodiment further comprises frame members 168, 168a parallel and opposite to each other and secured to the tracks (22, 22a), respectively. The frame members 168, 168a are secured to the tracks by way of known mechanism to join parts that are obvious to the person skilled in the art. The frame members are coupled to the platform members 164; 164*a*; 164*b*. It should be understood fewer or more than three platform members may be used depending on the load required to be carried and the length of the track members 22; 22*a*. As seen in FIG. 8, platform P can be mounted onto the chassis of the alternate embodiment. Similarly, a platform can be mounted to the preferred embodiment using pegs on the platform inserted into openings 53; 54. The openings on the chassis assembly 50 can be seen in FIG. 1B.

In this alternate embodiment for the retraction assembly, frame members 168; 168*a* are brought together and hinges 166 actuate to allow platform members 164; 164*a*; 164*b* to collapse inwardly. Retraction roller 169 is used to reduce the friction with the surface as the present invention is retracting. The retraction assembly subject of this alternate embodiment is retracted until the platform members 164; 164*a*; 164*b* are substantially parallel to each other, as seen in FIG. 9. In yet another alternate embodiment, hinges can be boat hinges that allow for the platform members to cooperate with the towing of a vessel.

Figure 10:
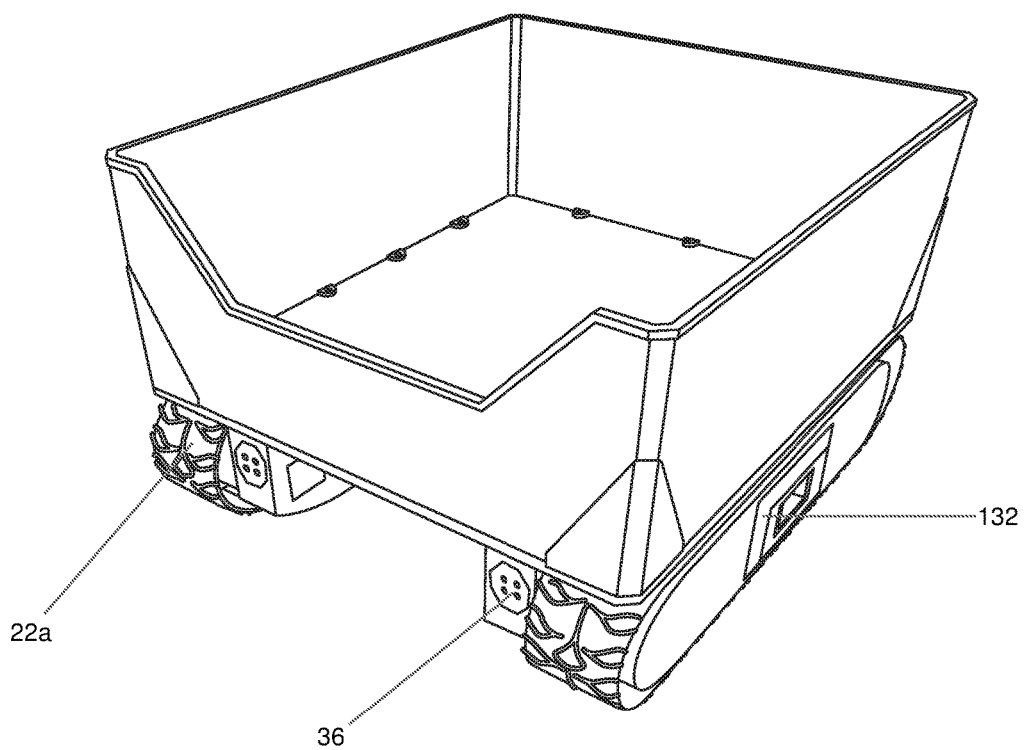
FIG. 10 shows the present invention implementing one of its possible uses, in this embodiment a transportation container member is mounted to the chassis of present invention.

As shown in FIG. 10 the platform can be configured to include a box unit on top of the platform.

In normal position the fork assembly 80 are positioned at the rear of the chassis assembly 50. In its operative environment, an operator positions the present invention in front of the pallet and executes the loading or unloading sequence. The self-loading mechanism can be made out of composite material such as, but not limited to, magnesium and aluminum components. The hydraulic system within vertical beam 188 will be a fully enclosed powered by battery 132. The pallet feet can sit on top of the mechanism's chassis assembly 50. In the engineering phase the platform can be extended over the track assembly 20 for protection, if necessary, adding weight.

In the loading sequence, the mechanism is placed in front of the pallet to be loaded with fork assembly 80 aligned with the pallet. Forks members 88 are dropped to the bottom position whereas lower fork member 388 touches the ground. Track assembly 20 moves backward exposing the fork assembly 80 and once fully exposed the forks 88 are slightly raised and locked in exposed position. The mechanism moves forward to position the forks 88 underneath the palled to be loaded.

Then, the exposed position is unlocked, lower fork member 388 drops to the ground and upper fork member 288 is raised along with the pallet. Track assembly 20 moves forward until the fork assembly 80 is at the robot's rear position and locked in position. The upper fork member 288 is raised to its middle position and the lower fork 388 is lowered and the pallet positioned on the robot's platform.

In the unloading sequence lower fork 388 is lowered towards the ground and upper fork member 288 is raised to the top elevating the pallet from the robot's platform. The self-loading mechanism is unlocked and the robot moves backwards until the forks 88 are in fully exposed position. The mechanism is locked and the upper fork member 288 is lowered to the lower position to free the pallet. The lower fork member 388 is elevated from the ground and the robot moves backwards. Once the forks 88 are out of the pallet the lower fork member 388 moves to the ground and the mechanism is unlocked. The robot moves forward until the fork 88 are at the robot's rear position and locks the mechanism. The two forks 88 are moved to home position at center height. In the motorized sequence the forth and back motion of fork assembly 80 may be automated with the addition of two stepper motors for each track side 22; 22*a*. This would save the motion sequence of the tracks 22; 22*a* when positioning the forks 88. Forks 88 would move forward fully extending them and moving underneath the pallet.

In the preceding specification, the present disclosure is described with reference to the specific embodiments. However, it will be apparent to a person with ordinary skill in the art that various modifications and changes can be made, without departing from the scope of the present disclosure. Accordingly, the specification and figures are to be regarded as illustrative examples of the present disclosure, rather than in restrictive sense. All such possible modifications are intended to be included within the scope of present disclosure.

What is claimed is:

1. A remotely operated apparatus comprising a track assembly, a wheel assembly, a retraction assembly, a control unit assembly, and a chassis assembly, said track assembly including at least two motorized track members, said retraction assembly used to expand and retract said at least two motorized track members, said chassis assembly having a chassis member mounted flush and parallel to the inside of said track members, said chassis member having the wheel assembly mounted to its inside walls, said wheel assembly having wheel members that are powered by a motor, said control unit assembly sandwiching said wheel assembly and including a battery, a control unit to control the movement of said track members and to receive and transmit data instructions to actuate said retraction assembly.

2. The apparatus of claim 1 including a plurality of ridges along said motorized track members, to increase the coefficient of friction between said motorized track members and a bottom surface.

3. The apparatus of claim 1 including a horizontal member extending between and connecting and keeping aligned said at least two track members.

4. The apparatus of claim 1 including a fork lift assembly having a forklift member, said forklift member including an upper and lower forklift member that are parallel to each other, said forklift assembly further including a vertical beam having a base and mounted perpendicularly to said forklift member, said upper forklift member being mounted above the base of said vertical beam, said lower forklift member being mounted below said base, said vertical beam being hydraulically powered and telescopically raised to lift said upper forklift member a predetermined distance, said vertical beam has attachment members perpendicularly extending towards and mounted within said track member slides located within said chassis assembly, track members moving forward and backwards allowing said forklift member to move forward and backwards along said track member slide.

5. The apparatus of claim 4 wherein the top of said vertical beam includes a cap.

6. The apparatus of claim 1 wherein said chassis assembly includes sensors at its front and rear distal ends, said sensors including a camera and lighting means.

7. The apparatus of claim 1 wherein said wheel assembly includes wheel members that are each powered by a motor.

8. The apparatus of claim 1 wherein said wheel assembly wherein select wheel members are powered by a motor.

9. The apparatus of claim 1 wherein said storage box-like transportation unit of a predetermined depth is mounted to said chassis assembly.

10. The apparatus of claim 1 wherein a platform is mounted to said chassis assembly.

11. The apparatus of claim 9 wherein a storage box-like transportation unit of a predetermined depth is mounted to said platform.

12. The apparatus of claim 1 wherein said retractable assembly includes a slide housing having a slide member housed therein, said retractable assembly includes motorized rotating members mounted to slide attachment members using a plurality of arms, said slide attachment members mounted to said slide member, when in the retracted position, slide attachment members are in the distalmost ends of said slide member, to expand the apparatus and push said track members away from each other, said motorized rotating members turn to slide said slide attachment members inwardly along said slide member thereby pushing said track members away from each other, said motorized rotating members mounted to said chassis assembly.

13. The apparatus of claim 1 wherein said retractable assembly includes two longitudinal side members mounted to said chassis assembly, three platform members aligned parallel to each other and perpendicular to said longitudinal side members, each of said platform members including a hinge that allows them to retract inwardly, a retraction roller that reduces the coefficient of friction as track members are pulled together as said platform members are retracted.

14. The retraction assembly of claim 13 wherein a platform is mounted on said platform members.

\* \* \* \* \*